United States Patent
Dugar et al.

(10) Patent No.: US 11,669,843 B2
(45) Date of Patent: Jun. 6, 2023

(54) AUTOMATED PLANOGRAM ANOMALY DETECTION

(71) Applicant: Walmart Apollo, LLC, Bentonville, AR (US)

(72) Inventors: Pranay Dugar, Udaipur (IN); Souradip Chakraborty, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 332 days.

(21) Appl. No.: 16/901,576

(22) Filed: Jun. 15, 2020

(65) Prior Publication Data

US 2021/0012272 A1  Jan. 14, 2021

(30) Foreign Application Priority Data

Jul. 13, 2019 (IN) .............................. 201941028192

(51) Int. Cl.
| | |
|---|---|
| *G06Q 10/00* | (2023.01) |
| *G06Q 30/018* | (2023.01) |
| *G06Q 10/087* | (2023.01) |
| *G06Q 10/10* | (2023.01) |
| *G06T 7/00* | (2017.01) |
| *G06T 7/13* | (2017.01) |
| *G06N 3/044* | (2023.01) |

(Continued)

(52) U.S. Cl.
CPC ......... *G06Q 30/0185* (2013.01); *G06N 3/044* (2023.01); *G06Q 10/087* (2013.01); *G06Q 10/10* (2013.01); *G06T 7/001* (2013.01); *G06T 7/0008* (2013.01); *G06T 7/13* (2017.01); *G06V 10/751* (2022.01); *G06V 10/82* (2022.01); *G06T 2207/30108* (2013.01); *G06T 2207/30252* (2013.01)

(58) Field of Classification Search
CPC .. G06Q 10/087; G06Q 10/10; G06Q 30/0185; G06N 3/0445; G06N 3/0454; G06N 3/08; G06T 7/0008; G06T 7/001; G06T 7/13; G06T 2207/30108; G06T 2207/30252; G06T 2207/20084; G06V 10/751; G06V 10/82
USPC ............................................... 705/28
See application file for complete search history.

(56) References Cited

U.S. PATENT DOCUMENTS

| | | | |
|---|---|---|---|
| 11,562,581 B2 * | 1/2023 | Adato .................... | H04N 23/66 |
| 2019/0087772 A1 * | 3/2019 | Medina ................. | B64C 39/024 |

(Continued)

*Primary Examiner* — Russell S Glass
(74) *Attorney, Agent, or Firm* — Barta, Jones & Foley, PLLC

(57) ABSTRACT

An automated planogram anomaly detection solution rapidly and reliably identifies mismatches between planograms and actual item placement. Examples receive a real time (RT) image of a shelf unit corresponding to at least a first portion of a planogram; detect, within the RT image, item boundaries for a plurality of items on the shelf unit and tag boundaries for a plurality of tags associated with the shelf unit; extract text from at least one tag; extract attributes from at least one item; map the extracted item attributes with the extracted tag text; detect, based at least on the map, a planogram anomaly; and based at least on detecting the planogram anomaly, generate a report identifying the planogram anomaly (e.g., a mismatch between a tag and an item). Some examples compare the RT image with a ground truth (GT) image to detect anomalies, for example empty space on the shelf unit.

18 Claims, 15 Drawing Sheets

(51) Int. Cl.
*G06V 10/75* (2022.01)
*G06V 10/82* (2022.01)

(56) References Cited

U.S. PATENT DOCUMENTS

| 2020/0111053 A1* | 4/2020 | Bogolea | G06V 20/68 |
| 2020/0302510 A1* | 9/2020 | Chachek | H04W 4/024 |

* cited by examiner

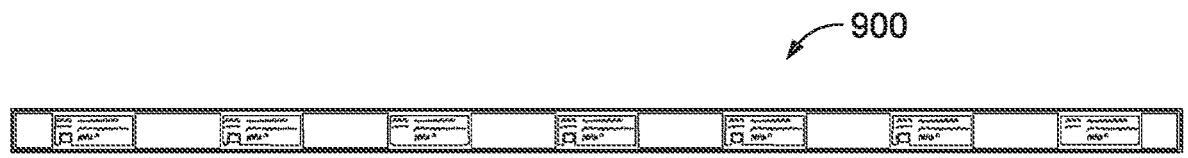
FIG. 9
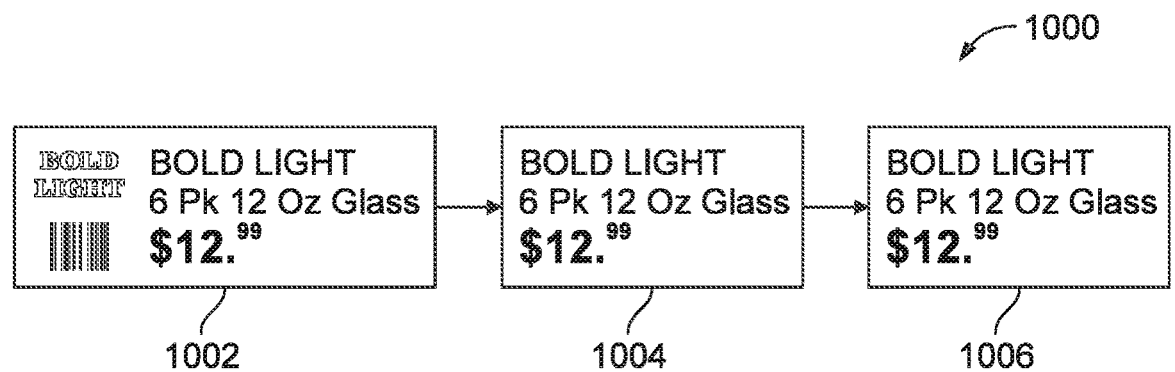
FIG. 10
```
In [137] : text_tess
Out [137] : 's38q\xc2\xa2 bold light 6 pk 12 oz glass | 1 $12 99'
```
FIG. 11

AUTOMATED PLANOGRAM ANOMALY DETECTION

BACKGROUND

In large retail and warehousing environments, shelf items may be located incorrectly, resulting in a mismatch between the items and the tags attached to the shelf below the item. When this occurs within retail facilities, a customer may have difficulty locating a desired item or, if the item is found, the customer may have difficulty ascertaining the price for the item. Also, when this occurs in either retail or warehousing environments, employees may make incorrect decisions regarding restocking shelves, such as failing to restock an item that is depleted from the shelf or overstocking an item that has accumulated in an incorrect location. For some operations, detecting incorrectly-located items across a large collection of shelf units can become challenging.

A planogram is a diagram or model that indicates the placement of retail products on shelf units, and thereby provides details on the placement of products in a retail facility. Some planograms identify the aisle shelf unit location at which a particular item is located. Therefore, a mismatch between a shelf tag and the item on the shelf above the tag is one type of planogram anomaly. Another type of planogram anomaly is an empty shelf space above a tag, which means that the item is either misplaced or depleted from the shelf.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

An automated planogram anomaly detection solution enables improved efficiency by rapidly identifying mismatches between planograms and actual item placement, with high confidence. Examples receive a real time (RT) image of a shelf unit corresponding to at least a first portion of a planogram; detect, within the RT image, item boundaries for a plurality of items on the shelf unit and tag boundaries for a plurality of tags associated with the shelf unit; extract text from at least one tag of the plurality of tags, to produce extracted tag text; extract attributes from at least one item of the plurality of items, to produce extracted item attributes; map the extracted item attributes with the extracted tag text; detect, based at least on the map, a planogram anomaly; and based at least on detecting the planogram anomaly, generate a report identifying the planogram anomaly. In some examples, planogram anomalies include mismatches between a tag and an item. Some examples compare the RT image with a ground truth (GT) image to detect anomalies, for example empty space on the shelf unit.

BRIEF DESCRIPTION OF THE DRAWINGS

The disclosed examples are described in detail below with reference to the accompanying drawing figures listed below:

FIG. 9 shows a detected edge image for an image area containing tags.

FIG. 10 illustrates stages of a text extraction process;

FIG. 11 illustrates text extraction results;

DETAILED DESCRIPTION

Figure 1:
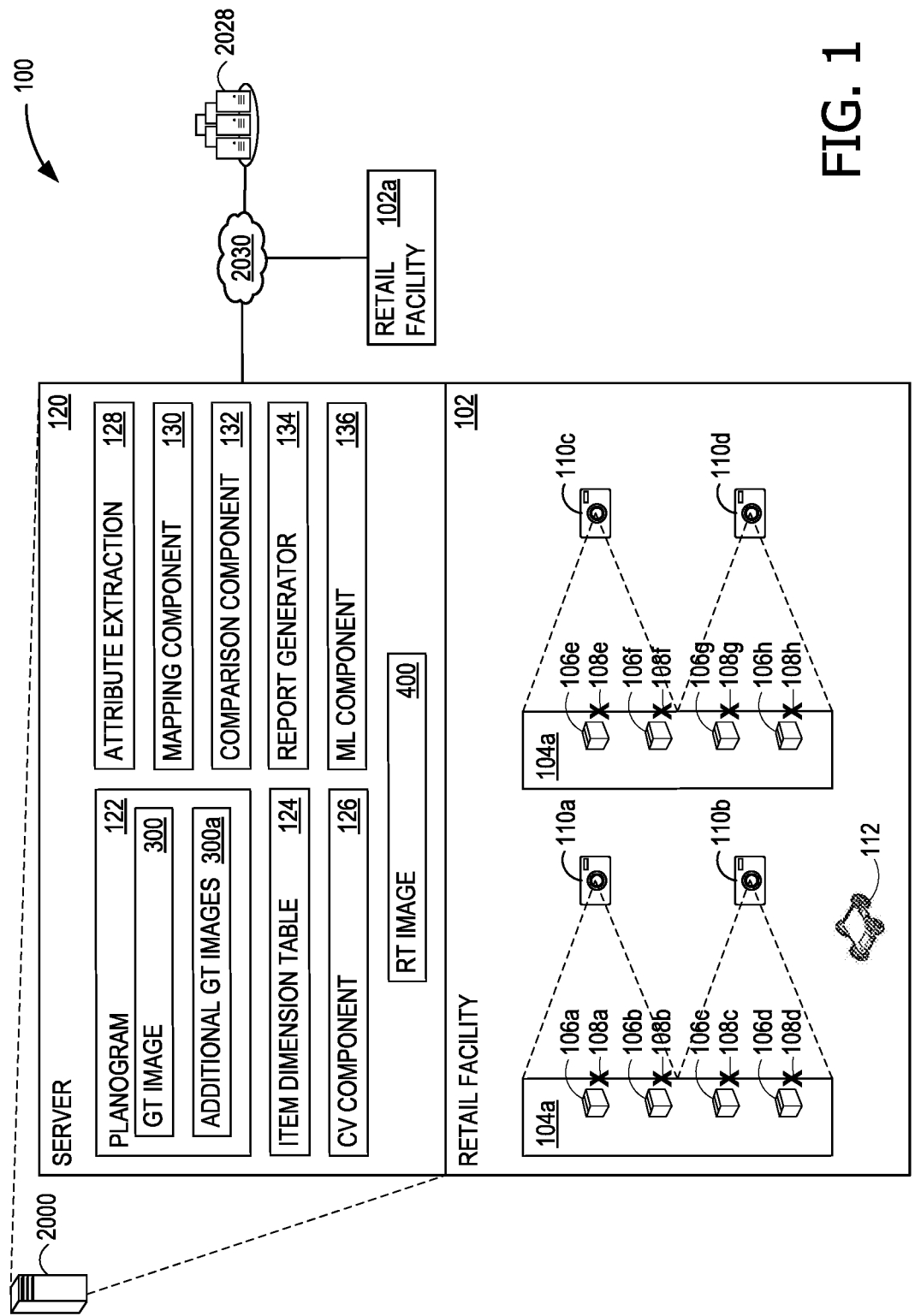
FIG. 1 illustrates an exemplary arrangement that advantageously employs automated planogram anomaly detection.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseam.

An automated planogram anomaly detection solution rapidly and reliably identifies mismatches between planograms and actual item placement. Examples receive a real time (RT) image of a shelf unit corresponding to at least a first portion of a planogram; detect, within the RT image, item boundaries for a plurality of items on the shelf unit and tag boundaries for a plurality of tags associated with the shelf unit; extract text from at least one tag; extract attributes from at least one item; map the extracted item attributes with the extracted tag text; detect, based at least on the map, a planogram anomaly; and based at least on detecting the planogram anomaly, generate a report identifying the planogram anomaly (e.g., a mismatch between a tag and an item). Some examples compare the RT image with a ground truth (GT) image to detect anomalies, for example empty space on the shelf unit.

Aspects of the disclosure operate in an unconventional way to provide rapid and reliable anomaly detection for planograms in retail and warehousing environments (e.g., e-commerce warehousing environments) and other environments. Some examples employ a hierarchical approach and/or use computer vision (CV) and deep learning to provide for reliable automatic analyses. Some examples operate in real time, performing constant assessments; some examples operate based at least on a trigger event, such as a timer or other event. To support CV operations, some examples used in-place cameras, cameras on devices carried by employees, cameras on carts or vehicles navigated by employees, cameras on automated ground vehicles (AGVs), and/or a combination. Other camera options are also possible. Aspects of the disclosure are thus able to identify when an item is misplaced, when an item is missing from its proper location, when a tag missing, and when an item attribute is missing. In some examples, items mismatches can be further classified as direct and indirect. A direct mismatch is a clear difference between items, such as apples and oranges. An indirect mismatch occurs when the mismatch relates to size, brand name, color, low-calorie versus regular formula products, or some other difference that is more complex than a direct mismatch.

In some examples the hierarchy of a pipeline for item tag validation is as follows: The tags in an isle are identified from an image and the text from the tags is extracted. Then the item on the shelf above each tag is detected for comparison. Image similarity between a detected item and the item which is related to the tag (from which the text is extracted) is computed and a comparison is performed. A further comparison is performed using the text on the item, which is extracted using text extraction from images. A mismatch is identified in a hierarchical manner. In some examples, a direct mismatch will be identified in the image similarity comparison, while an indirect mismatch (e.g., Coke is located on the shelf above a tag for Diet Coke, or an item of a different size is above the tag) is identified with the text extracted from the item image.

FIG. 1 illustrates an exemplary arrangement 100 that advantageously employs automated planogram anomaly detection. Arrangement 100 includes a retail facility 102 having a plurality of shelf units 104a and 104b, with a plurality of items 106a-106h located on the shelf units 104a and 104b. A plurality of tags 108a-108h are also on the shelf units 104a and 104b to provide price information to customers of retail facility 102. A set of cameras 110a-110d have views of shelf units 104a and 104b, as indicated, and are each operable to capture RT images of various portions of shelf units 104a and 104b. An AGV 112 also carries a camera. In some examples, cameras are provided on carts and vehicles operated by employees of retail facility 102, and devices carried by employees of retail facility 102. In some examples, unmanned aerial vehicles (UAVs) carry cameras. Cameras 110a-110d, and any other cameras used for planogram anomaly detection, transmit images of shelf units 104a and 104b to a planogram anomaly detection server 120, such as RT image 400. In some examples, server 120 is an implementation of a computing node 2000, which is described in more detail in relation to FIG. 20.

Server 120 holds data, including a planogram 122 that includes GT image 300 (see FIG. 3) and additional GT images 300a. In item dimension table 124 includes attributes, a description, the universal product code (UPC), and other information for each of items 106a-106h. A CV component 126 (which includes cameras 110a-110d) also includes an image processing component, for example an edge detector. An attribute extraction component 128 is operable to extract attributes, from RT image 400, for at least one of tags 108a-108h and at least of items 106a-106h. Some examples of attribute extraction component 128 use long short-term memory (LSTM) processes, Tesseract LSTM optical character recognition (OCR) processes, and convolutional neural networks (CNNs).

LSTM is an artificial recurrent neural network (RNN) architecture used for deep learning applications, and leverages feedback connections to process sequences of data. An LSTM cell can process data sequentially and keep its hidden state trough time. LSTM units are units of an RNN; an RNN composed of LSTM units is often referred to as an LSTM network. Tesseract LSTM OCR can read multiple different languages, and the primary character classifier function in Tesseract OCR is based on an implementation an LSTM neural network or LSTM network. Additional details for the processes described for server 120 is provided in the following figures.

A mapping component 130 is operable to map the extracted attributes for the at least one item with the extracted attributes for the at least one tag. A comparison component 132 is operable to detect, based at least on the mapping (produced by mapping component 130), a planogram anomaly. In some examples, cosine similarity is used a measure of similarity between two non-zero vectors of an inner product space. A report generator 134 is operable to generate a report identifying the planogram anomaly. An ML component 136 provides training for CNN models, such as for example mismatch classification. In some examples, some or all of the functionality described for server 120, including ML component 136, is also available as a cloud-based service on a cloud resource 2028 across a network 2030. This permits a second retail facility 102a to leverage ML training accomplished for retail facility 102.

Figure 2:
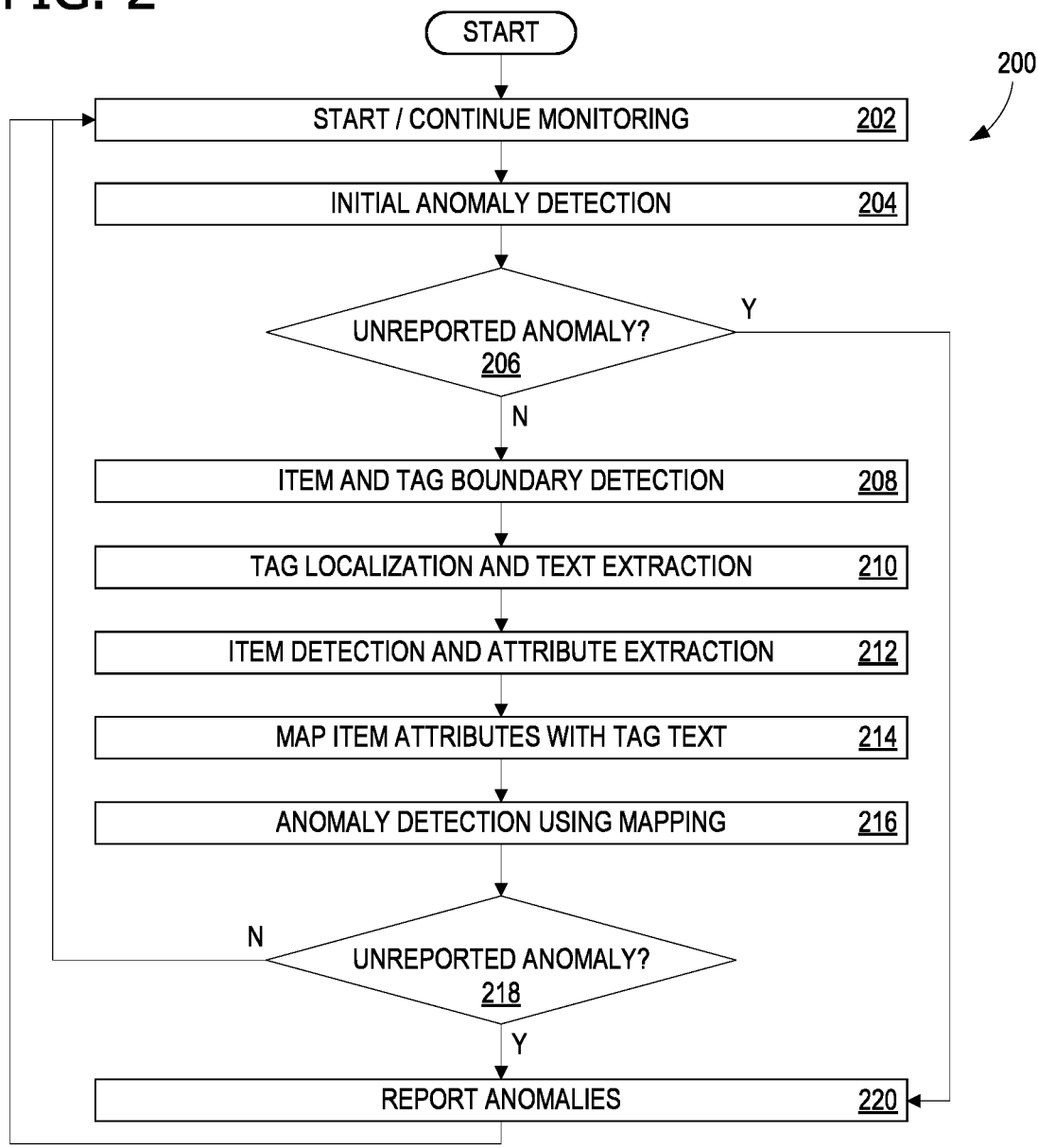
FIG. 2 shows a flow chart of exemplary operations associated with the arrangement of FIG. 1.

FIG. 2 shows a flow chart 200 of exemplary operations associated with arrangement 100 (of FIG. 1). In some examples, some or all of the computer operations described for flow chart 200 are performed as computer-executable instructions on computing node 2000 (see FIG. 20). Flow chart 200 commences with operation 202, which includes initiating (or continuing) monitoring for planogram anomaly. In some examples a timer acts as a trigger event to begin operation 202. In some examples, an employee using a handheld device collects an image, acting as a trigger event. In some examples, a mounted camera (on a cart, human-operated vehicle, AGV, or even a UAV) imaging a new portion of a shelf unit acts as a trigger event.

Operation 204 includes initial planogram anomaly detection. In operation 204, an RT image is received of a shelf unit corresponding to at least a first portion of a planogram. Anomalies that can be identified by comparing the RT image with a GT image for the shelf unit (e.g., the RT image and the GT image overlap relative to some portion of the planogram) are detected. In some examples, anomalies that can be identified in operation 204 include blank (empty) shelf space, broken items, overcrowding, and others. Thus, in some examples, detecting, within the RT image, anomalies comprises detecting empty space on the shelf unit. In some examples, detecting, within the RT image, anomalies comprises performing a CNN process. In some examples, detecting, within the RT image, anomalies comprises calculating a cosine similarity. Decision operation 206 determines whether a new anomaly, that has not yet been reported, has been identified. If so, the newly-detected anomaly is reported in operation 220, and flow chart 200 returns to operation 202.

Operation 208 includes detecting, within the RT image, item boundaries for a plurality of items on the shelf unit and tag boundaries for a plurality of tags associated with the shelf unit. In some examples, detecting item boundaries comprises using detected edges from the edge detection process. In some examples, the edge detection process comprises a Canny edge detection process.

Operation 210 includes localizing at least one tag of the plurality of tags and extracting text from the at least one tag. Some examples leverage known tag size and shape to facilitate localization. In some examples, extracting text from the at least one tag comprises performing an OCR process. In some examples, extracting text from the at least one tag comprises performing an LSTM process. Operation 212 includes detecting at least one item of the plurality of items and extracting attributes from the at least one item. In some examples, extracting attributes from the at least one item comprises performing an OCR process. In some examples, extracting attributes from the at least one item comprises performing a CNN-LSTM process. Operation 214 includes mapping the extracted item attributes with the extracted tag text. In some examples, the item image attributes are mapped with the extracted tag text. In some examples, text extracted from the at least one item is mapped with the extracted tag text.

Operation 216 includes detecting, based at least on the mapping, a planogram anomaly, mapping the extracted item attributes with the extracted tag text comprises mapping text extracted from the at least one item with the extracted tag text. In some examples, detecting, based at least on the mapping, a planogram anomaly comprises determining a similarity metric. In some examples, the similarity metric comprises a Jaccard similarity metric. In some examples, detecting, based at least on the mapping, a planogram anomaly comprises determining a mismatch between the at least one tag and the at least one item. In some examples, determining a mismatch between the at least one tag and the at least one item comprises determining whether the mismatch is a direct mismatch or an indirect mismatch. If no anomalies are detected, decision operation 218 returns a flow chart 200 to operation 202 to continue monitoring. Otherwise, based at least on detecting the planogram anomaly, operation 220 includes generating a report identifying the planogram anomaly. Additional details on the operations thus described are provided in the relation to the following figures.

Figure 3:
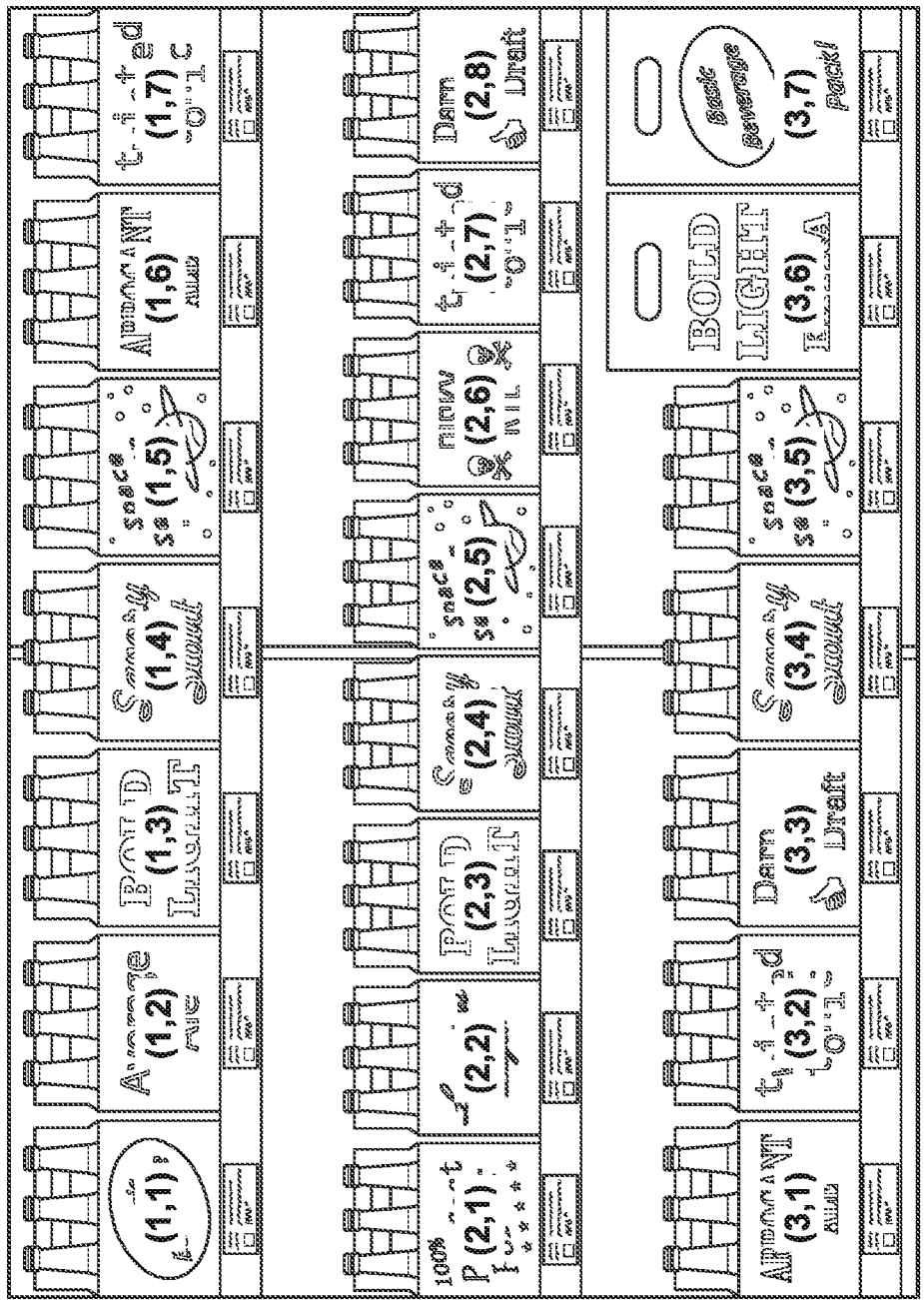
FIG. 3 shows a ground truth (GT) image of a retail facility shelf location.

FIG. 3 shows a ground truth (GT) image 300 of a retail facility shelf location, such as may be stored in planogram 122 (of FIG. 1). GT image 300 corresponds to a portion of a planogram. Multiple items and tags are visible in GT image 300. Locations for each of the items is annotated on GT image 300, for example showing locations (1,1) through (3,7). Identification and detection will be accomplished for these items and tags to support an item-tag validation process. The item in location (2,3) will be used as an example in the description of some of the following figures. The automated planogram anomaly detection described herein is for any conditions (anomalies) that are found within the portion of the planogram that corresponds to GT image 300. The processes described herein are repeated for other portions of the planogram, using images corresponding to those other portions.

Figure 4:
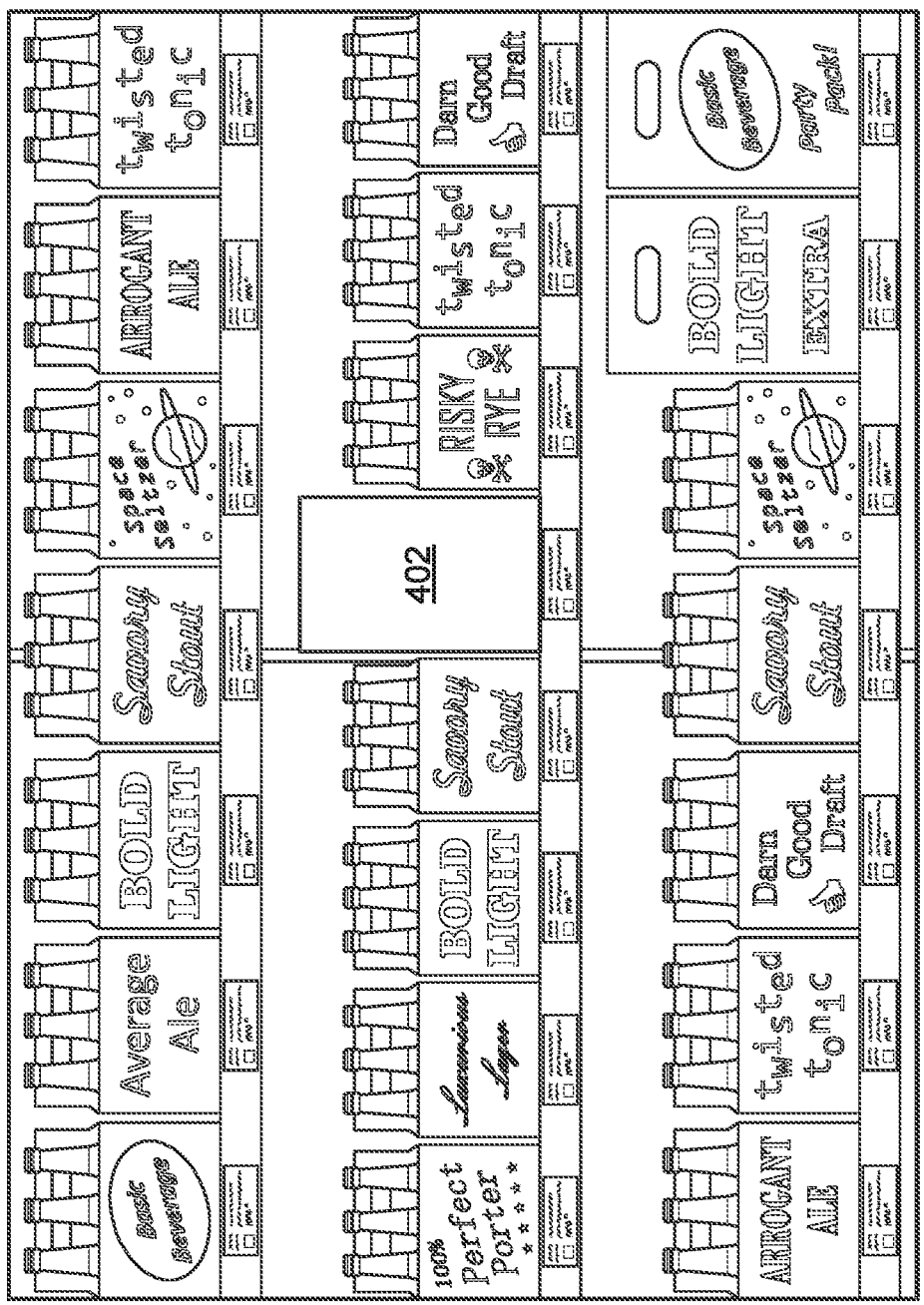
FIG. 4 shows a real time (RT) image corresponding to the GT image of FIG. 3.

FIG. 4 shows a real time (RT) image 400 corresponding to GT image 300 that is collected for the anomaly detection. RT image 400 has an annotated empty location 402. In some examples, RT image 400 is captured by CV component 126 (of FIG. 1). In some examples, initial anomaly detection is performed that identifies any overall anomalous behavior using a comparison of RT image 400 with GT image 300. It is possible to leveraging the image-embeddings of a proper planogram image (e.g., GT image 300) or a set of images (e.g., additional GT images 300*a*) corresponding to the same shelf unit location. The image embedding is extracted from the current planogram image for which the anomalous condition (if present) is to be detected. Some examples use transfer learning with a pre-trained CNN-based architecture in order to compare the image embedding between RT image 400 with GT image 300. If there is a sufficient difference from majority of the planogram images (e.g., GT image 300 and other planogram images corresponding to the same shelf unit location), such as a difference exceeding a threshold, an overall anomalous indicator value is set. Some examples use cosine to calculate the distance between a vector derived from RT 400 and the vectors for the set of known good images.

This permits detection of first level anomalies such as empty (blank) shelf space, overcrowding, improper ordering, and others. These first level anomalies are often detectable without detailed attribute extraction (e.g., image attributes and text). Empty location 402 is an example of a detected first level anomaly.

Figure 5:
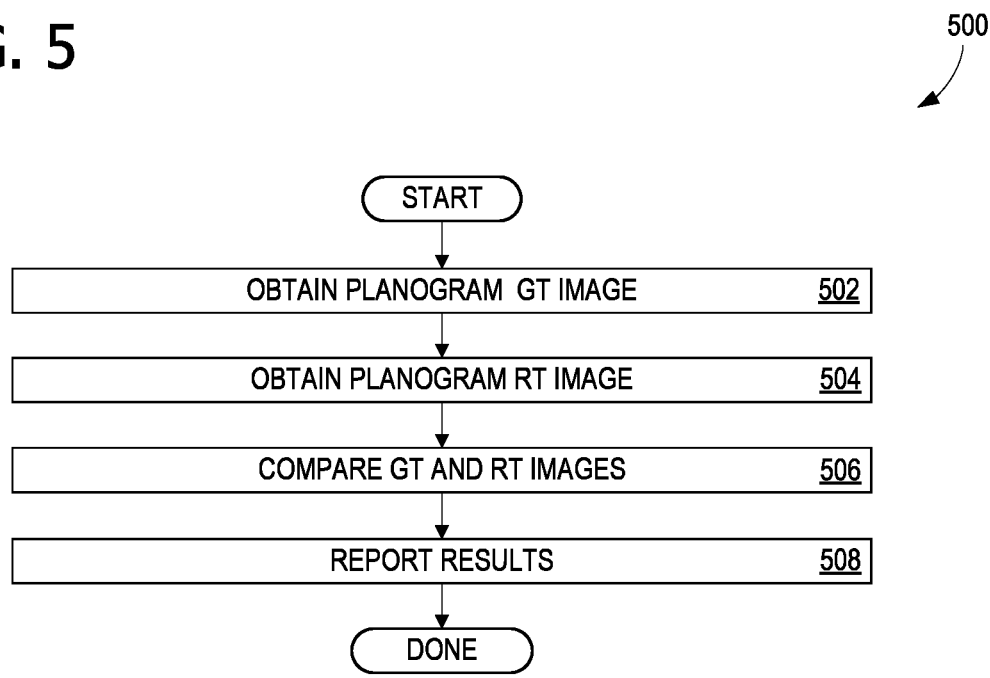
FIG. 5 shows another flow chart of exemplary operations associated with the arrangement of FIG. 1.

FIG. 5 shows a flow chart 500 of exemplary operations for detection of first level anomalies. In some examples, some or all of the computer operations described for flow chart 500 are performed as computer-executable instructions on computing node 2000 (see FIG. 20). Flow chart 500 commences with operation 502, which includes obtaining GT image 300, and operation 504 includes obtaining RT image 400. The images each contain multiple items and tags; in some examples the images are collected using high resolution cameras that are able to capture tiny details and text. Operation 506 includes comparing RT image 400 with GT image 300. In some examples, a comparison of RT image 400 with GT image 300 is based on image embedding that uses transfer learning. In some examples, CNN based transfer learning and cosine similarity are used with an adaptive threshold. Operation 508 includes reporting ant detected first level anomalies.

Upon completion of the first level anomaly detection, RT image 400 is passed through the next stage of the pipeline, which involves item and tag detection and validation. Some example use deep learning. Image processing and natural language processing method drill down at an item level and extract deep attributes for item-tag validation. To accomplish planogram boundary detection for items and tags, edge detection is performed.

Figure 6:
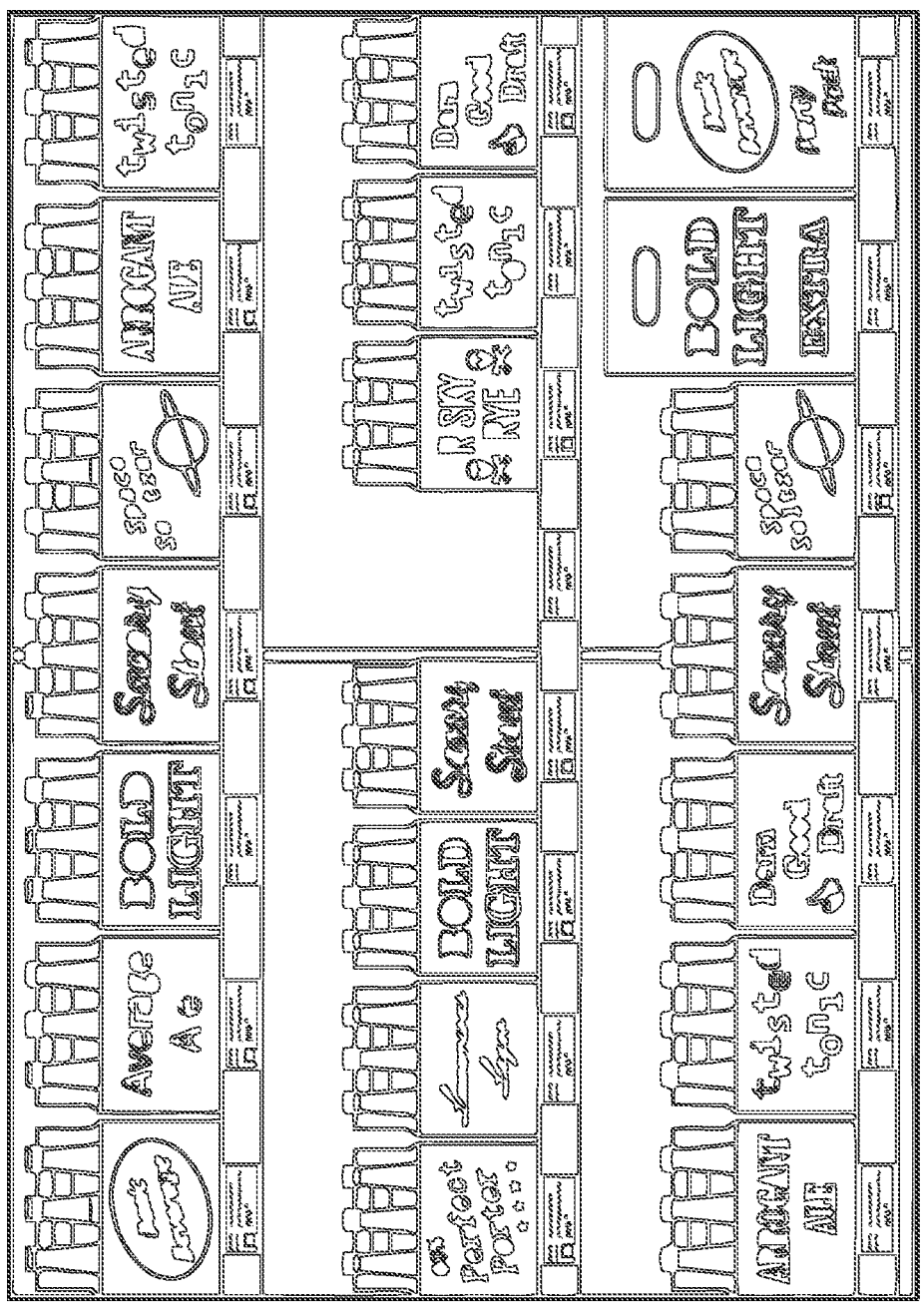
FIG. 6 shows a detected edge image corresponding to the RT image of FIG. 4.

FIG. 6 shows a detected edge image 600 corresponding to RT image 400. In some examples, detected edge image 600 is produced from RT image 400 using Canny edge detection. As can be seen in detected edge image 600, there exist several boundaries which separate the items from the tags. The boundaries for both the items and the tags should be correctly detected. In some examples, a neural net architecture is created and deployed to identify crossing points in an image (e.g., RT image 400), which will become aid in marking boundaries around the items. A crossing point is as, within an image having multiple items on each of the shelves, a point above each shelf which marks the end of the area (within the image) of a first item and the beginning of an area of a second (neighbor) item in that shelf. A crossing point detection algorithm assists with segmenting the planogram image (e.g., RT image 400) into various items.

In some examples, gradient-based edge detection is coupled with a custom rule-based neural network model that has been trained on similar images to detect boundaries for the items and tags. This assists with segmentation. In addition to convolution, some of the operations include:

Noise reduction—Removing unnecessary noise from the image, typically using a properly-sized Gaussian filter.
Gradient Computation—Passing the image through horizontal and vertical kernel filters to convert it into to gradient images.
Non-Maximum Suppression—Suppressing unwanted pixels that do not contribute to the gradient.
Thresholding—Filtering the edges to retain those meeting a threshold, thereby removing noisy edges.

Figure 7:
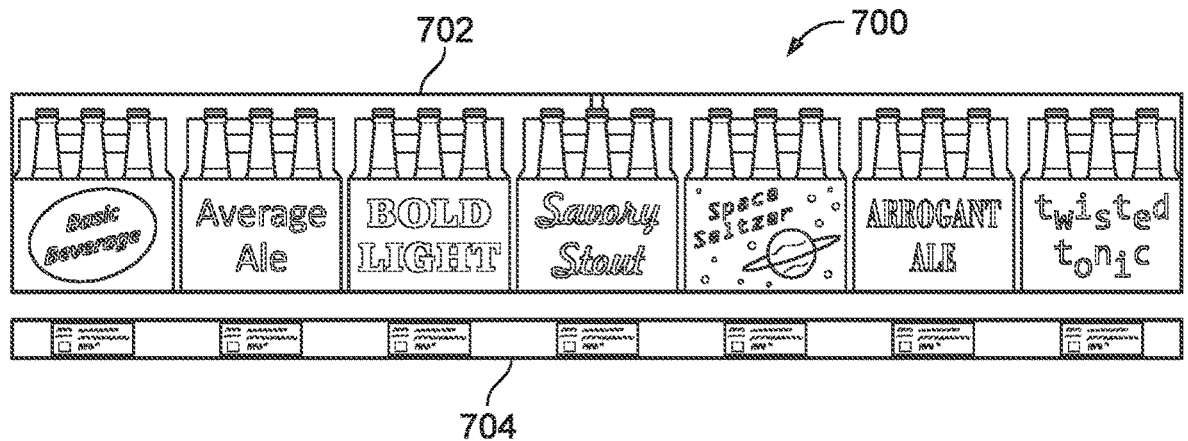
FIG. 7 illustrates boundary detection for items and tags.
Figure 8:
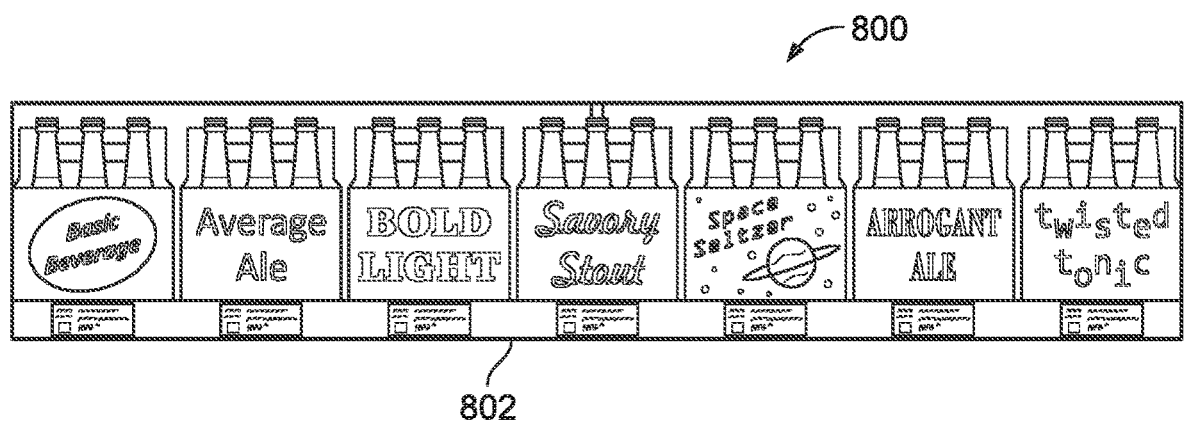
FIG. 8 illustrates tag localization.

FIG. 7 illustrates an image 700 showing boundary detection results for items and tags. A boundary 702 surrounds items, and a boundary 704 surrounds the tags. FIG. 8 illustrates tag localization, in which a multi-region boundary 802 is shown in an image 800. Tag localization is the next stage of the pipeline, and includes identifying the edges of the tags, similarly as edges of items had been detected. Segmenting the tags (using the detected edges) permits extracting text from the portions of the image that correspond to the tags. FIG. 9 shows a detected edge image 900 the region of image 800 that is within multi-region boundary 802 (which contains images of multiple tags).

FIG. 10 illustrates stages 1002-1006 of a text extraction process 1000. An image 1002 of a tag, extracted from a larger RT image, is further segmented to identify a text region 1004. An OCR process is performed on text region 1004 to produce extracted tag text 1006. For the text extraction, some examples use Tesseract, which leverages LSTMs to enhance capability. To recognize an image containing a single character, a CNN is often used. However, the text portion of a tag will generally contain multiple characters, producing text of arbitrary length. Recognizing a sequence of characters is a problem that can be solved using s are solved using RNNs and LSTMs. In the illustrated example, extracted tag text 1006 is "CORONA LIGHT 6Pk 12 Oz Glass $12 99". FIG. 11 illustrates text extraction results 1100 for a Tesseract based LSTM model applied to text region 1004.

Figure 12:
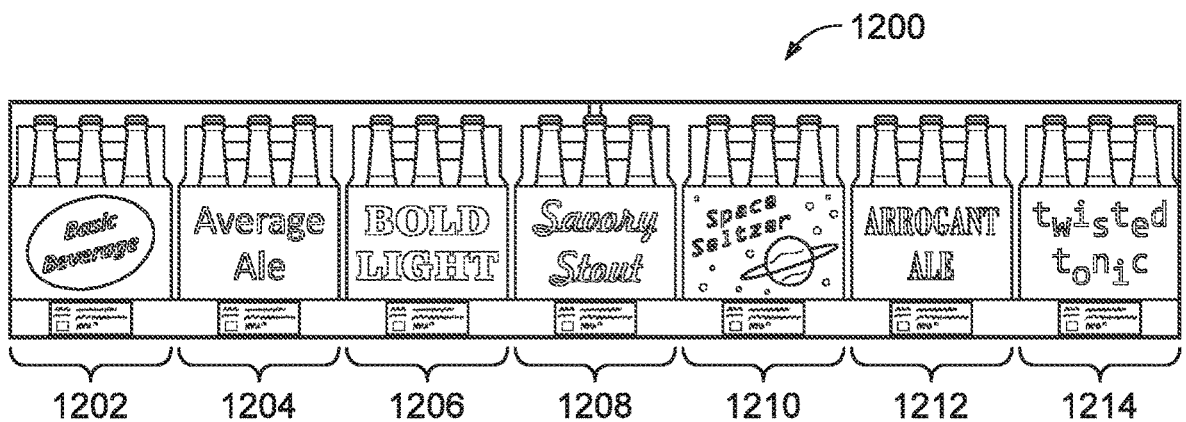
FIG. 12 illustrates detection of item images.
Figure 13:
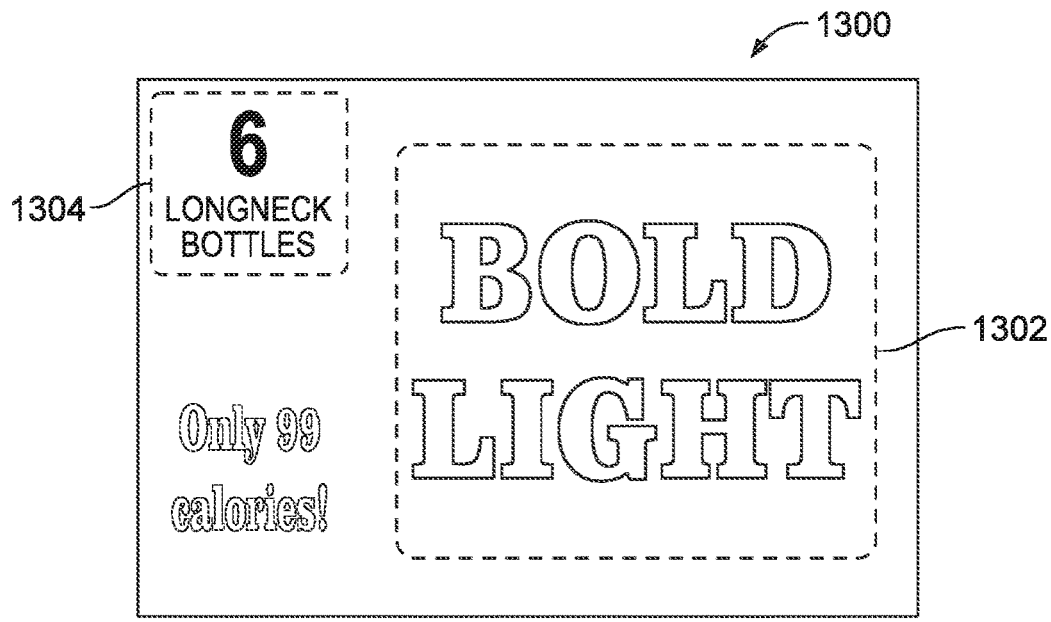
FIG. 13 illustrates item attribute identification.
Figure 14:
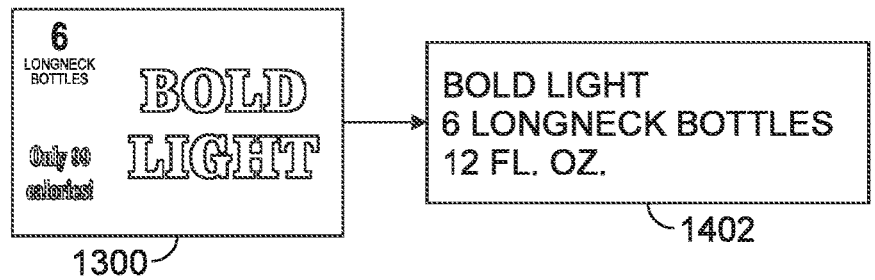
FIG. 14 illustrates item attribute extraction.

The next stage in the pipeline involves detection of item images and attribute extraction, to identify the item images and extract the important text attributes. Text extraction from images generally requires a significant investment in model training, because both text pixels and background images can take on different values. In some examples, a deep attention-based CNN-LSTM architecture, that has been trained on product images, is used to extract text attributes from images of the items. FIG. 12 illustrates an image 1200 containing multiple detected item images 1202-1214. FIG. 13 illustrates item attribute identification in item image 1300. Two text regions 1302 and 1304 are indicated. In some examples, image attribute extraction is based on an LSTM-CNN and Textbox++ ensemble model. FIG. 14 illustrates item text extraction process 1400, which is a subset of item attribute extraction. Combining text regions 1302 and 1304, the extracted item text 1402 is "CORONA LIGHT 6 LONG-NECK BOTTLES 12 FL. OZ."

Figure 15:
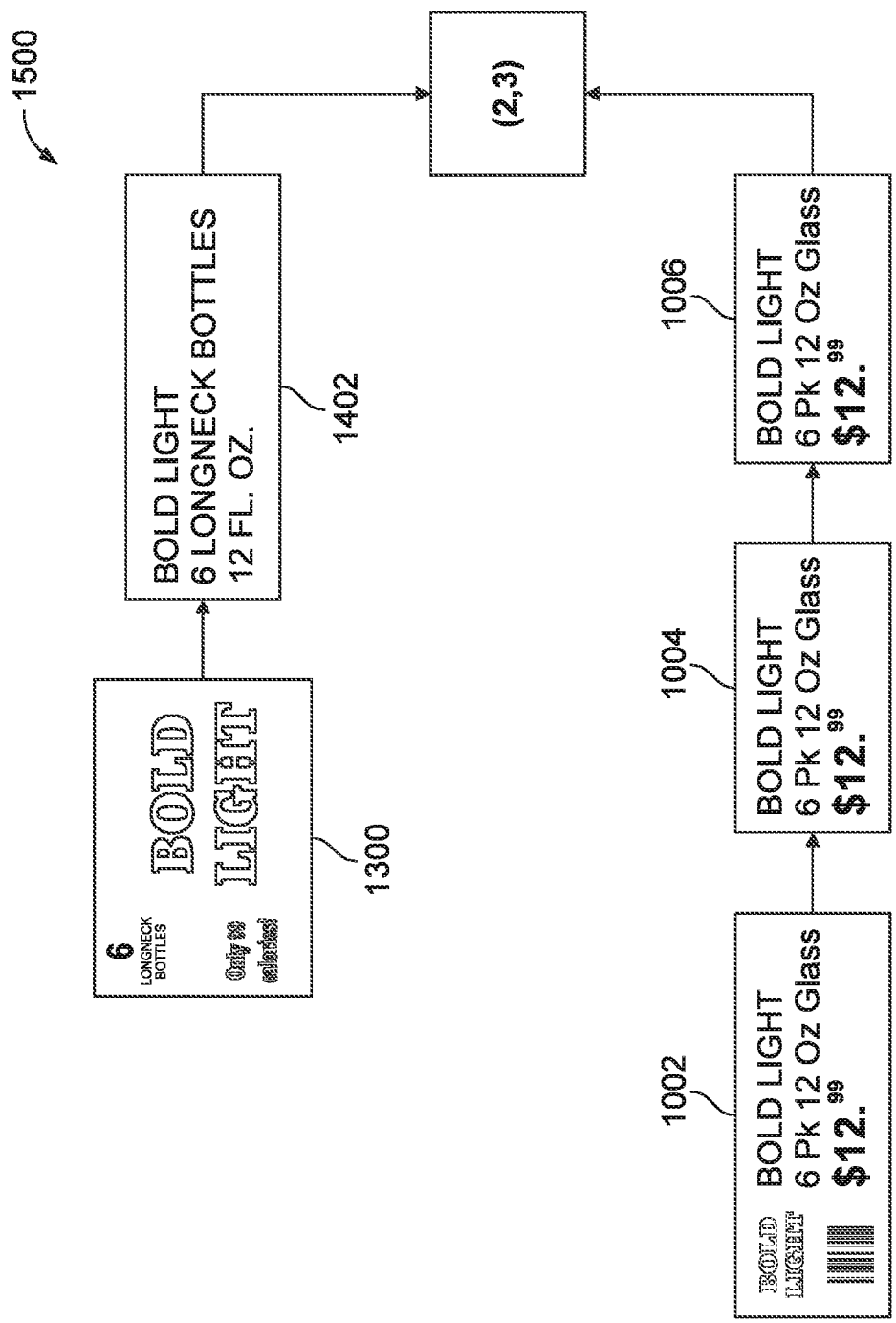
FIG. 15 illustrates mapping item attributes with tag text.

FIG. 15 illustrates a mapping 1500 that maps item attributes with tag text, specifically, mapping extracted item text 1402 with extracted tag text 1006. In some examples, the item and tag selected for a mapping are related by proximity; for example the item is paired with the tag directly beneath the item. Both extracted item text 1402 and extracted tag text 1006 are correlated with location (2,3) of planogram GT image 300 (of FIG. 3). Various text similarity metrics are useable, including cosine, Jaccard, Levenshtein distance, and others. Similarity metrics are used to find the similarity between item image attributes and tag attribute, and are robust, even in the presence of spelling errors and other similar issues. In some examples, thresholding based on past information and prior knowledge has been tailored to produce a value of the threshold that enables reliable determination of a mismatch between the item and the tag.

The next stage in the pipeline involves key anomaly detection from planogram images. In some examples, this is accomplished in stages. In a first stage an item dimension table is used for validation. An item dimension table (e.g., item dimension table 124 of FIG. 1) includes attributes, a description, the UPC, and other information for each item. Some item dimension tables include a copy of the text that appears on the item, and which can be compared with the extracted item text. Some possible error conditions include that the tag is missing from the shelf unit and the item attributes are missing or not visible. For some images, the situation might be that the tag is not present on the shelf. In such scenarios, the item dimension table is used and its contents are compared with the extracted item text, in order to determine the presence of an anomaly. For some images, the attribute information might not be present or visible. For example, for some t-shirts and jeans with internal tags, text attributes are not visible. So the text in the item dimension table is be used for mapping with the extracted tag text. In some examples, the additional text validation that is possible when using the item dimension table assists the reliability of the item-tag validation task. Identification of empty shelf is a significant aspect of the process. It can assist in assortment decisions using CNN-based image embeddings and thresholding in the next stage.

In some examples, mismatches are classified as direct and indirect. A direct mismatch is a clear difference between items, such as apples and oranges. An indirect mismatch occurs when the mismatch relates to size, brand name, color, low-calorie versus regular formula products, or some other difference that is more complex than a direct mismatch. In some examples, a direct mismatch will be identified in the image similarity comparison, while an indirect mismatch (e.g., Coke is located on the shelf above a tag for Diet Coke, or an item of a different size is above the tag) is identified with the text extracted from the item image. When a mismatch is detected, it is indicated using an anomaly detection indicator, which is sent to employees and/or automates systems that can correct the conditions.

Figure 16:
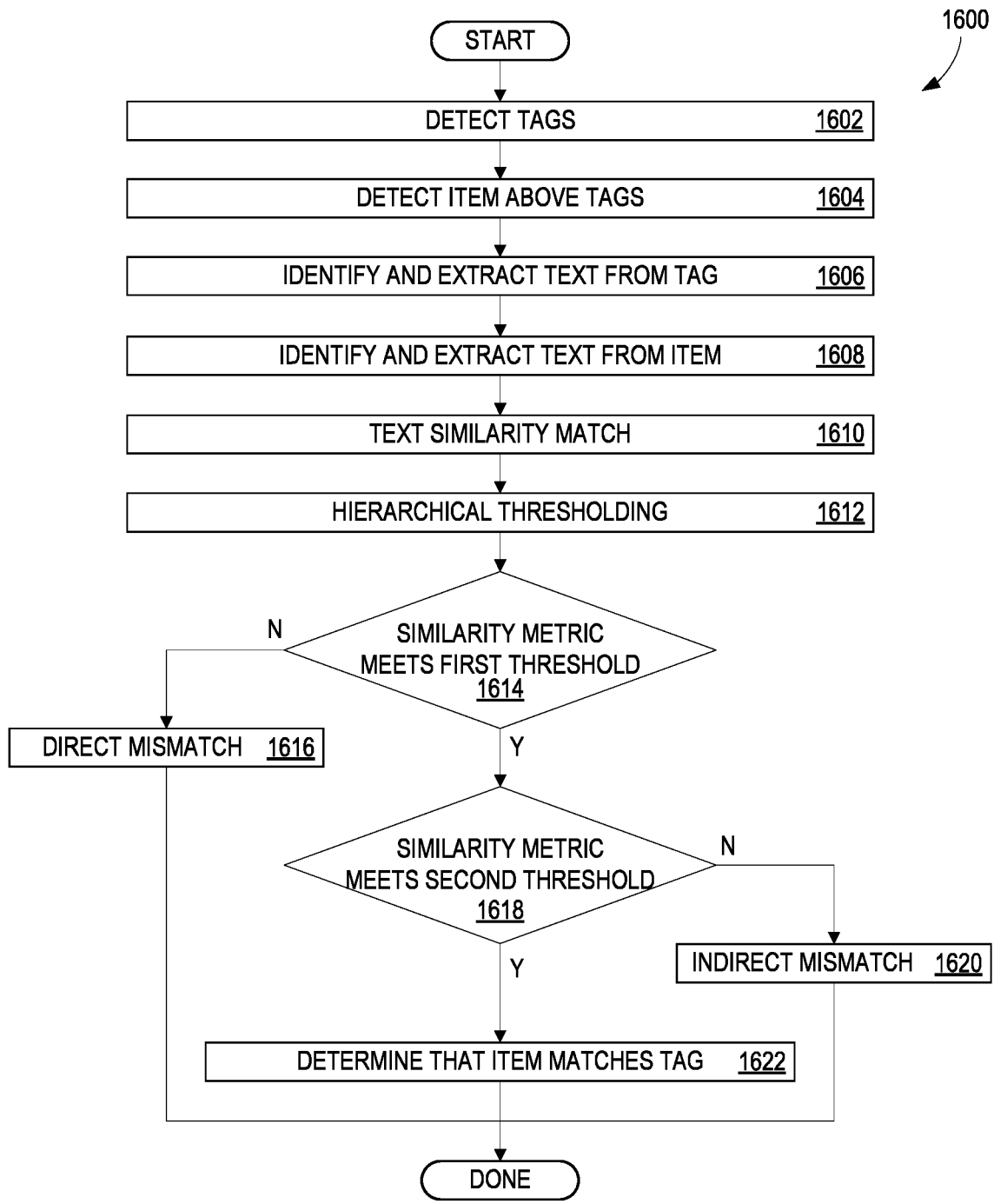
FIG. 16 shows another flow chart of exemplary operations associated with the arrangement of FIG. 1.

FIG. 16 shows a flow chart 1600 of exemplary operations associated with arrangement 100 (of FIG. 1). In some examples, some or all of the computer operations described for flow chart 1600 are performed as computer-executable instructions on computing node 2000 (see FIG. 20). Flow chart 1600 commences with operation 1602, which includes detecting the boundaries of all tags and detecting the tags within the boundaries. In some examples, tag detection uses robust gradient-based edge detection techniques (e.g., Canny edge detection). Operation 1604 includes detecting boundaries of the items and then detecting the items within those boundaries. In some examples, detecting an item above a tag includes using rule-based learning and coordinate measures.

Operation 1606 includes identifying (detecting) and extracting text from the tags. Some examples use LSTM neural network based OCR. Some examples use Tesseract and Text Box++. Operation 1608 includes identifying (detecting) and extracting text from the items. Some examples use LSTM based OCR. Some examples use CNN-LSTM. Operation 1610 includes performing a text similarity match. A one-to-one mapping with custom rules is performed, identifying the locations and mapping each tag to an item based on the locations of the tags and items within the image (e.g., the item is directly above the tag). Operation 1612 includes hierarchical thresholding to obtain mismatch identification, a yes/no result based on meeting a threshold. This includes calculating a similarity metric.

Decision operation 1614 determines whether the similarity metric meets a first threshold for a direct mismatch. If yes, operation 1616 classifies the mismatch as a direct mismatch. If no, decision operation 1618 determines whether the similarity metric meets a second threshold for an indirect mismatch. If yes, operation 1620 classifies the mismatch as an indirect mismatch. If both threshold tests fail, operation 1622 determines that the item matches the tag (e.g., the extracted item text and the extracted tag text are sufficiently similar).

Figure 17:
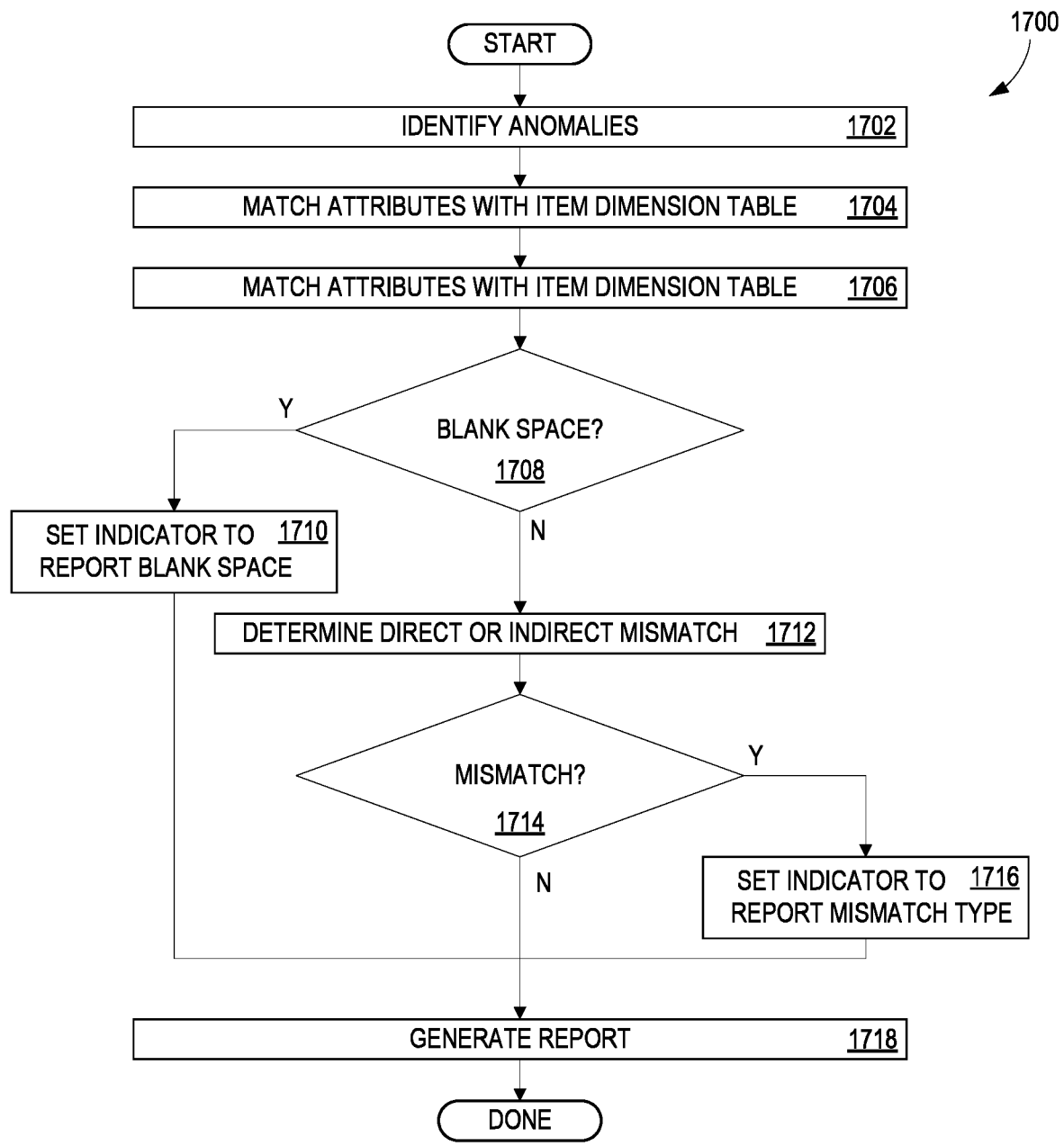
FIG. 17 shows another flow chart of exemplary operations associated with the arrangement of FIG. 1.

FIG. 17 shows a flow chart 1700 of exemplary operations associated with arrangement 100 (of FIG. 1). In some examples, some or all of the computer operations described for flow chart 1700 are performed as computer-executable instructions on computing node 2000 (see FIG. 20). Flow chart 1700 commences with operation 1702, which includes identifying anomalies with high confidence, using item tag validation with CV and image processing. In operation 1704, the item dimension table is used in attribute matching between the item and tag attributes (e.g., extracted text). This enhances confidence in the process results.

In operation 1706, an image embedding based similarity metric is calculated to detect blank spaces. If a blank space is detected in decision operation 1708, operation 1710 sets an indicator signal to report a blank (empty) shelf space. Operation 1712 determines direct or indirect mismatches using an attribute fuzzy match and optimal thresholding. If a mismatch is detected in decision operation 1714, operation 1716 sets an indicator signal to report the mismatch type. A report is generated in operation 1718, to facilitate a remedial operation to correct the anomaly.

Figure 18:
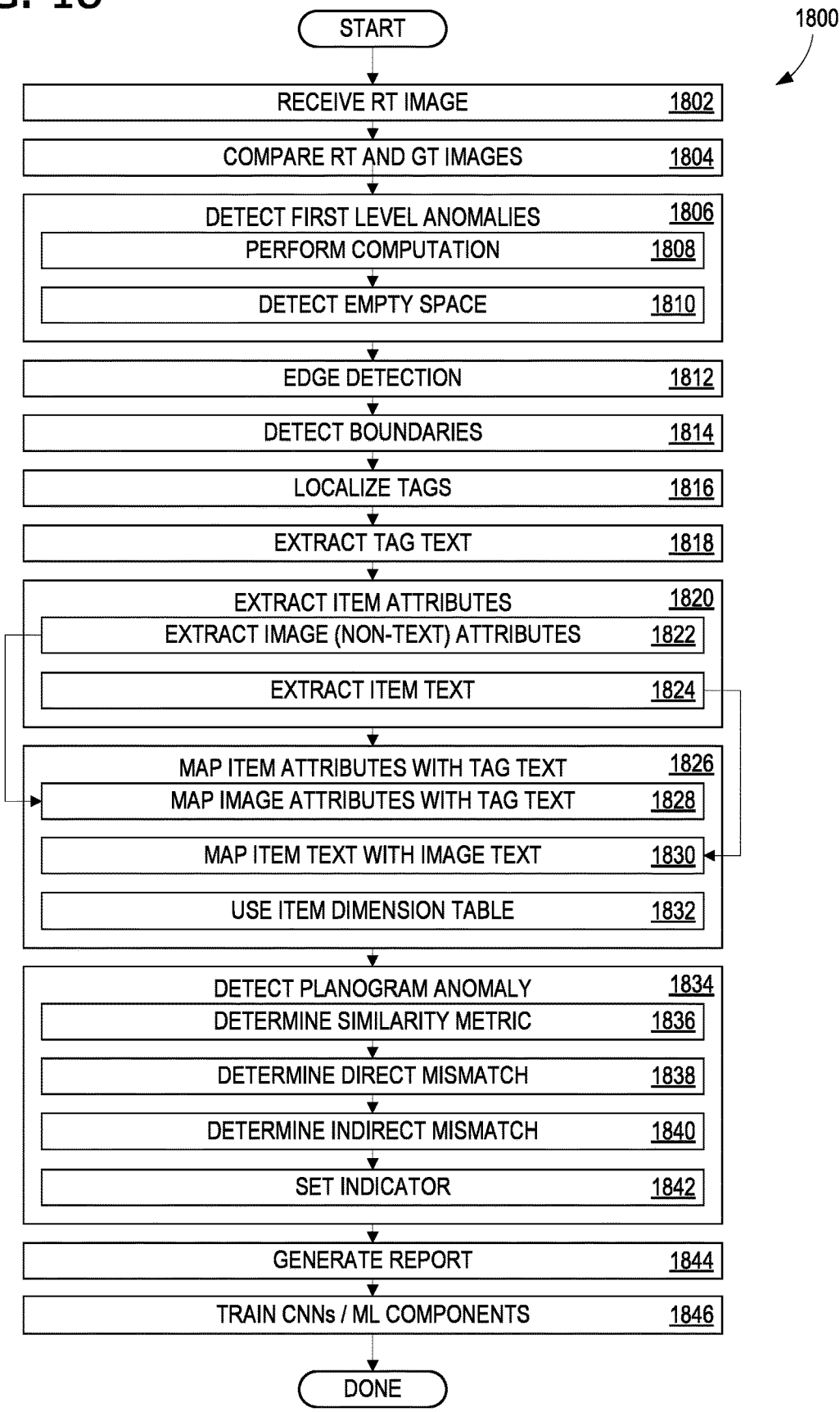
FIG. 18 shows another flow chart of exemplary operations associated with the arrangement of FIG. 1.

FIG. 18 shows a flow chart 1800 of exemplary operations associated with arrangement 100 (of FIG. 1). In some examples, some or all of the computer operations described for flow chart 1800 are performed as computer-executable instructions on computing node 2000 (see FIG. 20). Flow chart 1800 commences with operation 1802, which includes receiving a real time (RT) image of a shelf unit corresponding to at least a first portion of a planogram. Operation 1804 includes comparing the RT image with a GT image that corresponds to a second portion of the planogram that overlaps the first portion of the planogram. Thus, the RT image and the GT image overlap. Operation 1806 includes detect, within the RT image, first level anomalies. In support of this, operation 1808 includes performing computations. In some examples, this comprises performing a CNN process. In some examples, this comprises calculating a cosine similarity. Operation 1810 includes detecting empty space on the shelf unit. In an empty space is detected, an indicator is set so that a report will include the proper alert.

Operation 1812 includes performing an edge detection process on the RT image. In some examples, the edge detection process comprises a Canny edge detection process. Operation 1814 includes detecting, within the RT image, item boundaries for a plurality of items on the shelf unit and tag boundaries for a plurality of tags associated with the shelf unit. In some examples, detecting item boundaries comprises using detected edges from the edge detection process. Operation 1816 includes localizing at least one tag. Operation 1818 includes extracting text from at least one tag of the plurality of tags, to produce extracted tag text. In some examples, extracting text from the at least one tag comprises performing an OCR process. In some examples, extracting text from the at least one tag comprises performing an LSTM process.

Operation 1820 includes extracting attributes from at least one item of the plurality of items, to produce extracted item attributes. In some examples, the at least one item is located directly above the at least one tag. In some examples, operation 1820 includes operation 1822, which includes extracting image-based (non-text) attributes. In some examples, operation 1820 includes operation 1824, which includes extracting item text by performing an OCR process and/or a CNN-LSTM process. In some examples, operation 1820 includes both operations 1822 and 1824. Operation 1826 includes mapping the extracted item attributes with the extracted tag text. In some examples image-based (non-text) attributes are mapped in operation 1828, which is used when operation 1822 was performed. In some examples extracted item text is mapped in operation 1830, which is used when operation 1824 was performed. In some examples, operation 1832 includes mapping the extracted item attributes with the extracted tag text comprises using an item dimension table, as part of operation 1826.

Operation 1834 includes detecting, based at least on the mapping, a planogram anomaly. Operation 1834 includes operations 1836-1842. Operation 1836 includes determining a similarity metric. In some examples, the similarity metric comprises a Jaccard similarity metric. In some examples, the similarity metric uses item image attributes without OCR (e.g., when operation 1822 was performed). In some examples, the similarity metric uses extracted item text as the item image attribute (e.g., when operation 1824 was performed). Operation 1838 includes determining a direct mismatch between the at least one tag and the at least one item, such as by comparing the similarity metric with a first threshold. Operation 1840 includes determining an indirect mismatch between the at least one tag and the at least one item, such as by comparing the similarity metric with a second threshold. Operation 1842 includes setting an indicator for the type of mismatch identified.

Operation 1844 includes, based at least on detecting the planogram anomaly, generating a report identifying the planogram anomaly. The report includes the results of the indicator from operation 1842 and the empty space detection from operation 1810. Operation 1846 includes training a CNNs and ML components used for anomaly detection in any of the operations above.

Figure 19:
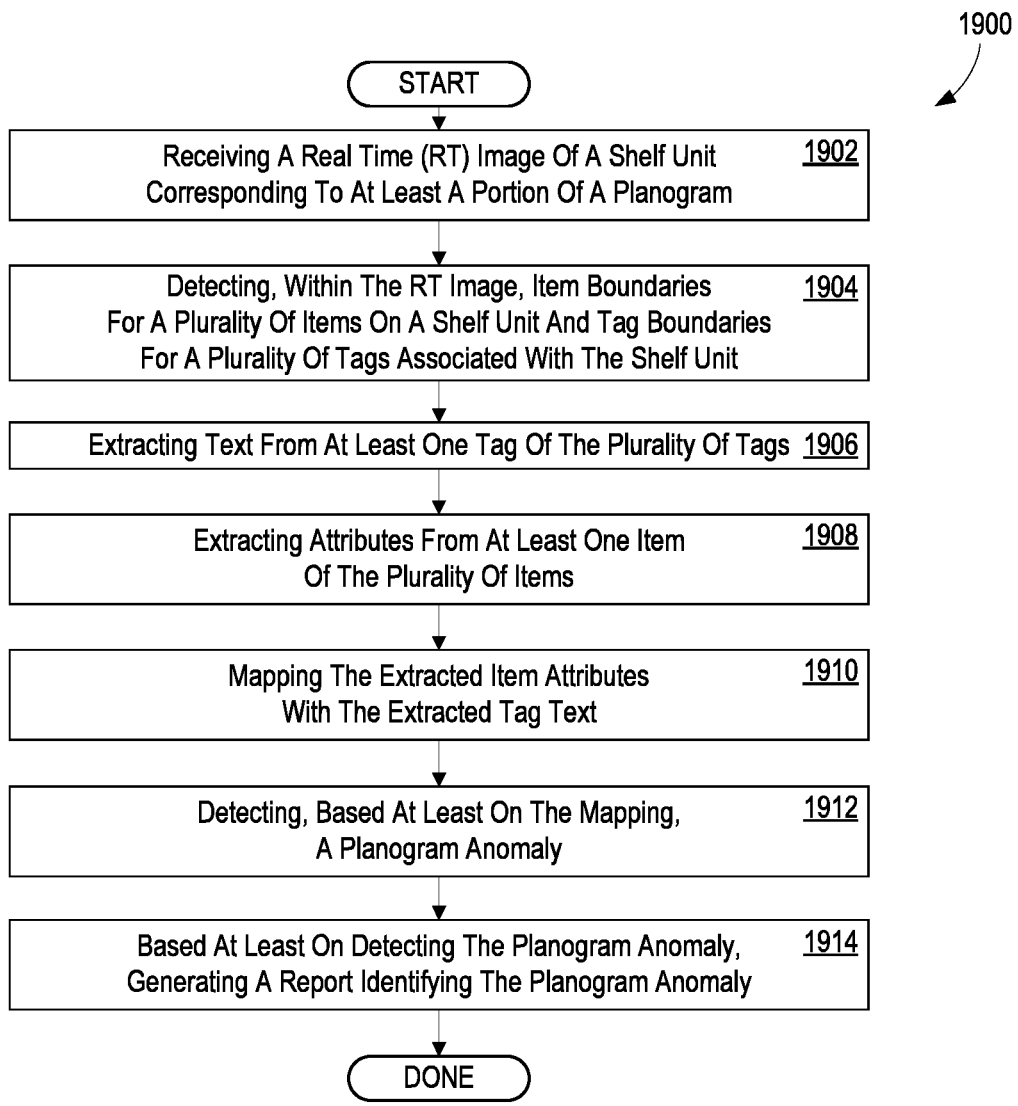
FIG. 19 shows another flow chart of exemplary operations associated with the arrangement of FIG. 1.

FIG. 19 shows a flow chart 1900 of exemplary operations associated with arrangement 100 (of FIG. 1). In some examples, some or all of the computer operations described for flow chart 1900 are performed as computer-executable instructions on computing node 2000 (see FIG. 20). Flow chart 1900 commences with operation 1902, which includes receiving a real time (RT) image of a shelf unit corresponding to at least a first portion of a planogram. Operation 1904 includes detecting, within the RT image, item boundaries for a plurality of items on the shelf unit and tag boundaries for a plurality of tags associated with the shelf unit. In some examples, detecting item boundaries comprises using detected edges from an edge detection process. Operation 1906 includes extracting text from at least one tag of the plurality of tags, to produce extracted tag text. In some examples, extracting text from the at least one tag comprises performing an OCR process. In some examples, extracting text from the at least one tag comprises performing an LSTM process.

Operation 1908 includes extracting attributes from at least one item of the plurality of items, to produce extracted item attributes. In some examples, extracting attributes from the at least one item comprises performing an OCR process. In some examples, extracting attributes from the at least one item comprises performing a CNN-LSTM process. In some examples, the at least one item is located directly above the at least one tag. Operation 1910 includes mapping the extracted item attributes with the extracted tag text. In some examples, mapping the extracted item attributes with the extracted tag text comprises mapping text extracted from the at least one item with the extracted tag text. In some examples, mapping the extracted item attributes with the extracted tag text comprises using an item dimension table.

Operation 1912 includes detecting, based at least on the mapping, a planogram anomaly. In some examples, detecting, based at least on the mapping, a planogram anomaly comprises determining a similarity metric. In some examples, the similarity metric comprises a Jaccard similarity metric. In some examples, detecting, based at least on the mapping, a planogram anomaly comprises determining a mismatch between the at least one tag and the at least one item. In some examples, determining a mismatch between the at least one tag and the at least one item comprises determining whether the mismatch is a direct mismatch or an indirect mismatch. Operation 1914 includes, based at least on detecting the planogram anomaly, generating a report identifying the planogram anomaly.

Exemplary Operating Environment

Figure 20:
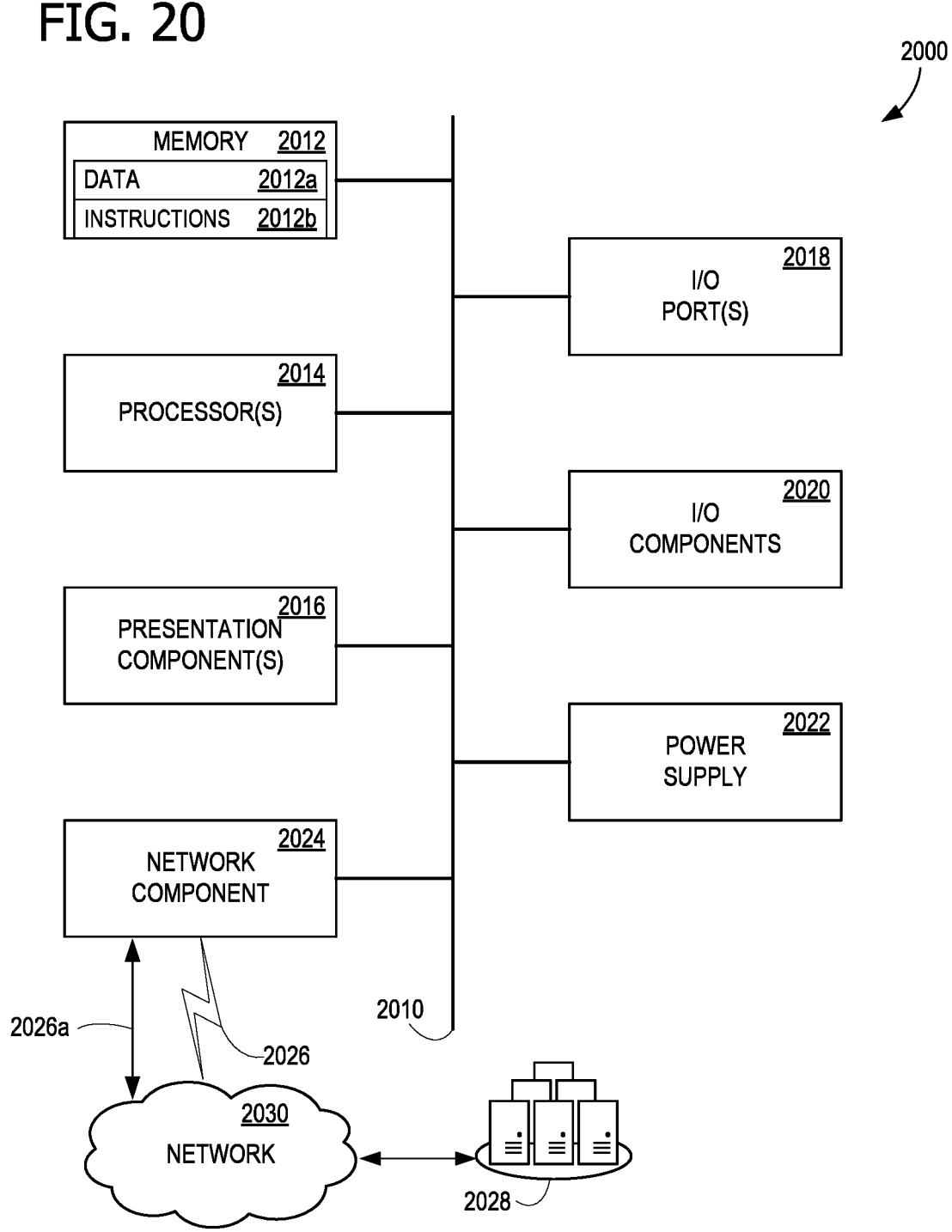
FIG. 20 is a block diagram of an example computing node for implementing aspects disclosed herein; and Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

FIG. 20 is a block diagram of an example computing node 2000 for implementing aspects disclosed herein and is designated generally as computing node 2000. Computing node 2000 is one example of a suitable computing environment and is not intended to suggest any limitation as to the scope of use or functionality of the invention. Neither should the computing node 2000 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 2030.

Computing node 2000 includes a bus 2010 that directly or indirectly couples the following devices: memory 2012, one or more processors 2014, one or more presentation components 2016, input/output (I/O) ports 2018, I/O components 2020, a power supply 2022, and a network component 2024. Computing node 2000 should not be interpreted as having any dependency or requirement related to any single component or combination of components illustrated therein. While computing node 2000 is depicted as a seemingly single device, multiple computing nodes 2000 may work together and share the depicted device resources. That is, one or more computer storage devices having computer-executable instructions stored thereon may perform operations disclosed herein. For example, memory 2012 may be distributed across multiple devices, processor(s) 2014 may provide housed on different devices, and so on.

Bus 2010 represents what may be one or more busses (such as an address bus, data bus, or a combination thereof). Although the various blocks of FIG. 20 are shown with lines for the sake of clarity, delineating various components can be accomplished with various other schemes. For example, a presentation component such as a display device can also be classified as an I/O component. Additionally, processors have internal memory. Thus, the diagram of FIG. 20 is merely illustrative of an exemplary computing node that can be used in connection with one or more embodiments. Distinction is not made between such categories as "workstation," "server," "laptop," "hand-held device," etc., as all are contemplated within the scope of FIG. 20 and the references herein to a "computing node" or a "computing device." Memory 2012 may include any of the computer-readable media discussed herein. Memory 2012 is used to store and access data 2012a and instructions 2012b operable to carry out the various operations disclosed herein. In some examples, memory 2012 includes computer storage media in the form of volatile and/or nonvolatile memory, removable or non-removable memory, data disks in virtual environments, or a combination thereof.

Processor(s) 2014 may include any quantity of processing units that read data from various entities, such as memory 2012 or I/O components 2020. Specifically, processor(s) 2014 are programmed to execute computer-executable instructions for implementing aspects of the disclosure. The instructions may be performed by the processor, by multiple processors within the computing node 2000, or by a processor external to the client computing node 2000. In some examples, the processor(s) 2014 are programmed to execute instructions such as those illustrated in the flowcharts discussed below and depicted in the accompanying drawings. Moreover, in some examples, the processor(s) 2014 represent an implementation of analog techniques to perform the operations described herein. For example, the operations may be performed by an analog client computing node 2000 and/or a digital client computing node 2000.

Presentation component(s) 2016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 2000, across a wired connection, or in other ways. Ports 2018 allow computing node 2000 to be logically coupled to other devices including I/O components 2020, some of which may be built in. Example I/O components 2020 include, for example but without limitation, a microphone, keyboard, mouse, joystick, game pad, satellite dish, scanner, printer, wireless device, etc.

In some examples, the network component 2024 includes a network interface card and/or computer-executable instructions (e.g., a driver) for operating the network interface card. Communication between the computing node 2000 and other devices may occur using any protocol or mechanism over any wired or wireless connection. In some examples, the network component 2024 is operable to communicate data over public, private, or hybrid (public and private) network 2030 using a transfer protocol, between devices wirelessly using short range communication technologies (e.g., near-field communication (NFC), Bluetooth® branded communications, or the like), or a combination thereof. Network component 2024 communicates over wireless communication link 2026 and/or a wired communication link 2026a to a cloud resource 2028 across network 2030. Various different examples of communication links 2026 and 2026a include a wireless connection, a wired connection, and/or a dedicated link, and in some examples, at least a portion is routed through the internet.

Although described in connection with an example computing node 2000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for automated planogram anomaly detection comprises: a processor; and a computer-readable medium storing instructions that are operative upon execution by the processor to: receive an RT image of a shelf unit corresponding to at least a first portion of a planogram; detect, within the RT image, item boundaries for a plurality of items on the shelf unit and tag boundaries for a plurality of tags associated with the shelf unit; extract text from at least one tag of the plurality of tags, to produce extracted tag text; extract attributes from at least one item of the plurality of items, to produce extracted item attributes; map the extracted item attributes with the extracted tag text; detect, based at least on the map, a planogram anomaly; and based at least on detecting the planogram anomaly, generate a report identifying the planogram anomaly.

Another exemplary system for automated planogram anomaly detection comprises: a CV component comprising a plurality of cameras and an image processing component operable to capture an RT image of a shelf unit, the RT image showing images of a plurality of tags and a plurality of items; an attribute extraction component operable to extract attributes, from the RT image, for at least one tag of the plurality of tags and at least one item of the plurality of items; a mapping component operable to map the extracted attributes for the at least one item with the extracted attributes for the at least one tag; a comparison component operable to detect, based at least on the mapping, a planogram anomaly; and a report generator operable to generate a report identifying the planogram anomaly.

An exemplary method of automated planogram anomaly detection comprises: receiving an RT image of a shelf unit corresponding to at least a first portion of a planogram; detecting, within the RT image, item boundaries for a plurality of items on the shelf unit and tag boundaries for a plurality of tags associated with the shelf unit; extracting text from at least one tag of the plurality of tags, to produce extracted tag text; extracting attributes from at least one item of the plurality of items, to produce extracted item attributes; mapping the extracted item attributes with the extracted tag text; detecting, based at least on the map, a planogram anomaly; and based at least on detecting the planogram anomaly, generating a report identifying the planogram anomaly.

An exemplary computer storage device has computer-executable instructions stored thereon for automated planogram anomaly detection, which, on execution by a computer, cause the computer to perform operations comprising: receiving an RT image of a shelf unit corresponding to at least a first portion of a planogram; detecting, within the RT image, item boundaries for a plurality of items on the shelf unit and tag boundaries for a plurality of tags associated with the shelf unit; extracting text from at least one tag of the plurality of tags, to produce extracted tag text; extracting attributes from at least one item of the plurality of items, to produce extracted item attributes; mapping the extracted item attributes with the extracted tag text; detecting, based at least on the map, a planogram anomaly; and based at least on detecting the planogram anomaly, generating a report identifying the planogram anomaly.

Alternatively, or in addition to the other examples described herein, examples include any combination of the following:
- the at least one item is located directly above the at least one tag;
- performing an edge detection process on the RT image;
- the edge detection process comprises a Canny edge detection process;
- detecting item boundaries comprises using detected edges from the edge detection process;
- localizing the at least one tag;
- extracting text from the at least one tag comprises performing an OCR process;
- extracting text from the at least one tag comprises performing an LSTM process;
- extracting attributes from the at least one item comprises performing an OCR process;
- extracting attributes from the at least one item comprises performing a CNN-LSTM process;
- mapping the extracted item attributes with the extracted tag text comprises mapping text extracted from the at least one item with the extracted tag text;
- mapping the extracted item attributes with the extracted tag text comprises using an item dimension table;
- detecting, based at least on the mapping, a planogram anomaly comprises determining a similarity metric;
- the similarity metric comprises a Jaccard similarity metric;
- detecting, based at least on the mapping, a planogram anomaly comprises determining a mismatch between the at least one tag and the at least one item;
- determining a mismatch between the at least one tag and the at least one item comprises determining whether the mismatch is a direct mismatch or an indirect mismatch;
- comparing the RT image with a GT image to detect, within the RT image, anomalies, wherein the GT image corresponds to a second portion of the planogram, and wherein the second portion of the planogram overlaps the first portion of the planogram;
- detecting, within the RT image, anomalies comprises detecting empty space on the shelf unit;
- detecting, within the RT image, anomalies comprises performing a CNN process;
- detecting, within the RT image, anomalies comprises calculating a cosine similarity;
- training a CNN used for anomaly detection;
- at least one camera of the plurality of cameras is mounted on an AGV;
- one or more computer storage devices having computer-executable instructions stored thereon for automated planogram anomaly detection, which, on execution by a computer, cause the computer to perform operations;
- receiving a real time (RT) image of a shelf unit corresponding to at least a first portion of a planogram;
- detecting, within the RT image, item boundaries for a plurality of items on a shelf unit and tag boundaries for a plurality of tags associated with the shelf unit;
- extracting text from at least one tag of the plurality of tags, to produce extracted tag text;
- extracting attributes from at least one item of the plurality of items, to produce extracted item attributes;
- mapping the extracted item attributes with the extracted tag text;
- detecting, based at least on the mapping, a planogram anomaly; and
- based at least on detecting the planogram anomaly, generating a report identifying the planogram anomaly.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. An automated planogram anomaly detection system, the system comprising:
    a processor; and
    a computer-readable medium storing instructions that are operative upon execution by the processor to:
        receive a real time (RT) image of a shelf unit corresponding to at least a first portion of a planogram;
        detect, within the RT image, item boundaries for a plurality of items on the shelf unit and tag boundaries for a plurality of tags associated with the shelf unit;
        extract tag text from at least one tag of the plurality of tags to produce extracted tag text;
        extract attributes from at least one item of the plurality of items to produce extracted item attributes, the at least one item associated with a location of the at least one tag;
        map the extracted item attributes to the extracted tag text;
        extract item text from the at least one item;

map the extracted item text to the extracted tag text;
detect, based at least on the mappings of the extracted item attributes to the extracted tag text and the extracted item text to the extracted tag test, a planogram anomaly, the planogram anomaly including a mismatch between the at least one tag and the at least one item, wherein detecting the planogram anomaly includes detecting whether the mismatch is a direct mismatch or an indirect mismatch; and
based at least on detecting the planogram anomaly, generate a report identifying the planogram anomaly.

2. The system of claim 1 wherein the location of the at least one item is directly above the at least one tag.

3. The system of claim 1 wherein the instructions are further operable to:
perform an edge detection process on the RT image.

4. The system of claim 3 wherein the edge detection process comprises a Canny edge detection process.

5. The system of claim 1 wherein the instructions are further operable to:
compare the RT image with a ground truth (GT) image to detect, within the RT image, anomalies, wherein the GT image includes annotated locations, items, and tags for at least the first portion of the planogram.

6. The system of claim 5 wherein detecting, within the RT image, anomalies comprises detecting empty space on the shelf unit.

7. The system of claim 1 wherein extracting attributes from the at least one item comprises performing a convolutional neural network long short-term memory (CNN-LSTM) process.

8. The system of claim 1 wherein detecting the planogram anomaly further comprises:
determining a similarity metric based on the mapping of the extracted item attributes to the extracted tag text, wherein the similarity metric comprises a Jaccard similarity metric.

9. The system of claim 8 wherein the mismatch is identified in a hierarchical manner, the direct mismatch identified using the similarity metric and the indirect mismatch identified using the mapping of the extracted item text to the extracted tag text.

10. A method of automated planogram anomaly detection, the method comprising:
receiving a real time (RT) image of a shelf unit corresponding to at least a first portion of a planogram;
detecting, within the RT image, item boundaries for a plurality of items on the shelf unit and tag boundaries for a plurality of tags associated with the shelf unit;
extracting tag text from at least one tag of the plurality of tags to produce extracted tag text;
extracting attributes from at least one item of the plurality of items to produce extracted item attributes, the at least one item associated with a location of the at least one tag;
mapping the extracted item attributes to the extracted tag text;
extracting item text from the at least one item;
mapping the extracted item text to the extracted tag text;
detecting, based at least on the mappings of the extracted item attributes to the extracted tag text and the extracted item text to the extracted tag text, a planogram anomaly, the planogram anomaly including a mismatch between the at least one tag and the at least one item, wherein detecting the planogram anomaly includes detecting whether the mismatch is a direct mismatch or an indirect mismatch; and
based at least on detecting the planogram anomaly, generating a report identifying the planogram anomaly.

11. The method of claim 10 wherein the location of the at least one item is directly above the at least one tag.

12. The method of claim 10 further comprising:
performing an edge detection process on the RT image.

13. The method of claim 10 further comprising:
comparing the RT image with a ground truth (GT) image to detect anomalies within the RT image, wherein the GT image includes annotated locations, items, and tags for at least the first portion of the planogram.

14. The method of claim 10 further comprising:
determining a similarity metric based on the mapping of the extracted item attributes to the extracted tag text.

15. The method of claim 4 wherein the mismatch is identified in a hierarchical manner, the direct mismatch identified using the similarity metric and the indirect mismatch identified using the mapping of the extracted item text to the extracted tag text.

16. The method of claim 14 wherein the similarity metric comprises a Jaccard similarity metric.

17. The method of claim 10 wherein mapping the extracted item attributes with the extracted tag text comprises using an item dimension table.

18. The method of claim 10 wherein extracting the tag text from the at least one tag comprises performing a long short-term memory (LSTM) process.

* * * * *